Oct. 19, 1948.　　　　　F. KOCH　　　　　2,451,833
ROLL FEED
Filed Aug. 22, 1947　　　　　　　　　　　2 Sheets-Sheet 1
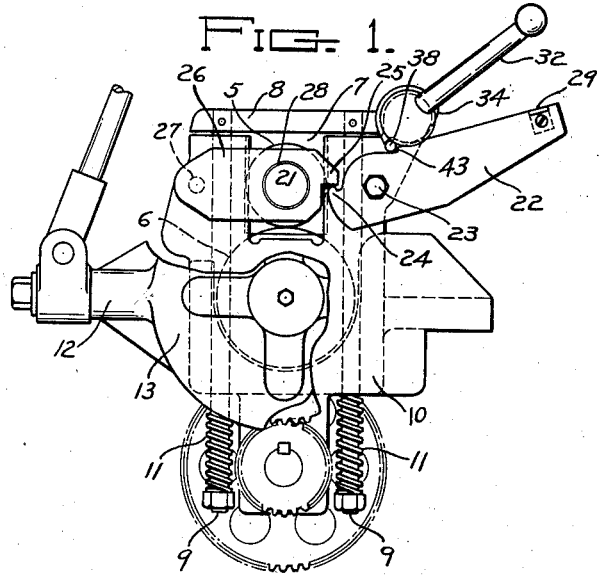
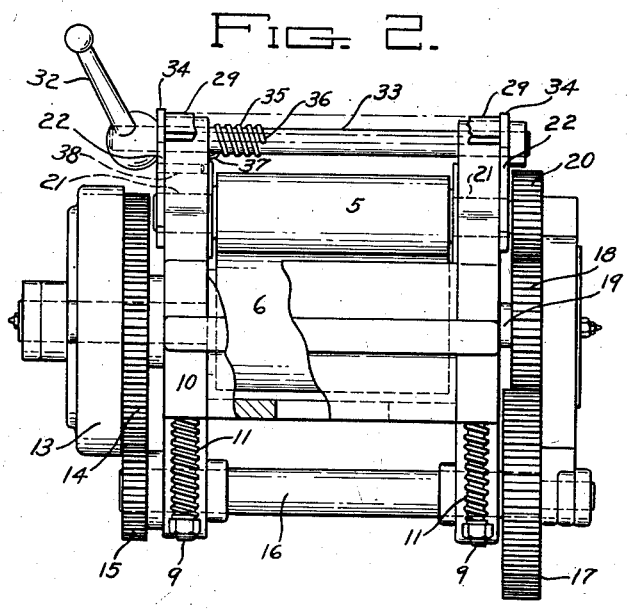
FREDERICK KOCH
INVENTOR.
BY
ATTORNEY.

Oct. 19, 1948.  F. KOCH  2,451,833
ROLL FEED

Filed Aug. 22, 1947  2 Sheets-Sheet 2

FREDERICK KOCH
          INVENTOR.

BY

ATTORNEY.

Patented Oct. 19, 1948

2,451,833

UNITED STATES PATENT OFFICE 2,451,833

ROLL FEED

Frederick Koch, Sparta, N. J., assignor to Associated Patentees, Inc., Ampere, N. J., a corporation of New Jersey Application August 22, 1947, Serial No. 770,098

3 Claims. (Cl. 271—2.4)

1

The invention herein disclosed relates to roll feeds such as used with punch presses and the like.

Objects of the invention are to simplify and improve the mechanism for separating the feed rolls and for automatically returning them to operative, stock gripping relation.

Particularly it is a purpose of the invention to provide accessible and conveniently operable handle mechanism for retaining the rolls in separated relation, which will be self-releasing in character so as to allow return of the rolls to operative relation without lag or delay.

Other desirable objects attained by the invention are set forth or will appear in the course of the following specification.

The drawings accompanying and forming part of the specification illustrate one of the present commercial embodiments of the invention. Structure, however, may be modified and changed as regards the immediate disclosure without departure from the true spirit and actual scope of the invention as hereinafter defined and claimed.

Fig. 1 in the drawings is an end elevation of a pair of feed rolls having the invention applied thereto and shown with certain parts broken away;

Fig. 2 is a part sectional end elevation of the mechanism;

Figure 3:
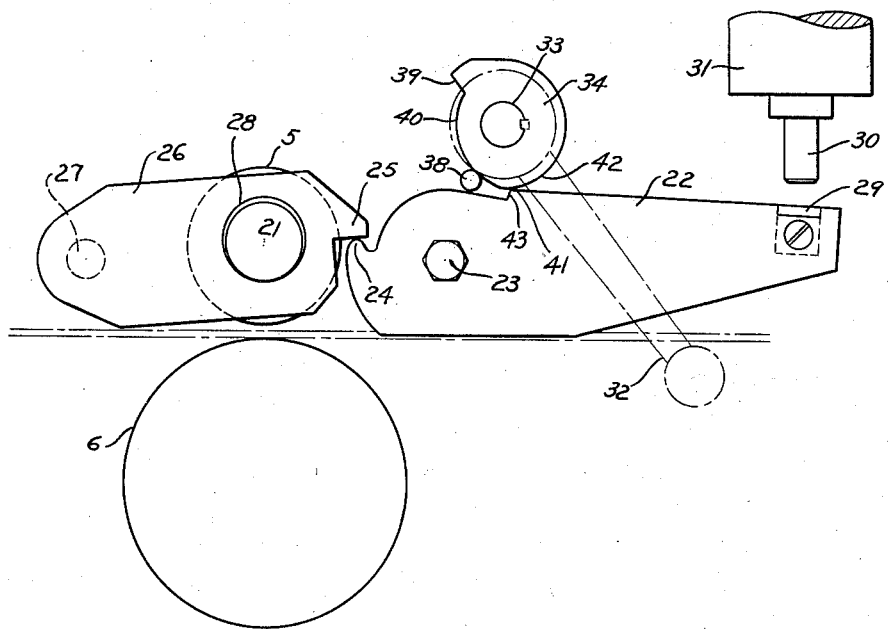
Fig. 3 is a broken diagrammatical view illustrating cooperative relation of the parts.

In the illustration upper and lower feed rolls are indicated at 5, 6, the upper one journaled in vertically slidable bearings 7 held down by caps 8 and pull-down rods 9 extending down through the bearing heads 10 and tensioned by springs 11 about the lower ends of the rods.

Intermittent feed motion is imparted to the rolls from an oscillating rock lever 12 having a one-way clutch connection at 13 with a gear 14, the latter in mesh with the pinion 15 on shaft 16 below the bottom roll and carrying a gear 17 in mesh with gear 18 on the shaft 19 of the lower roll, the latter gear also in mesh with gear 20 fast on the upper roll shaft 21.

Trip levers 22 are shown pivoted on the side frames at 23, equipped at their inner ends with rounded leverage extensions 24 engaged beneath lugs or shoulders 25 on levers 26 pivoted at 27 and having openings 28 loosely receiving the shaft portions 21 of the upper roll.

The trip levers 22 are connected by a cross bar 29 adapted for engagement by an adjustable trip stud 30 carried by some portion 31 of the press head.

2

To effect instant tripping of the feed at any time, a handle 32 is provided on a cross shaft 33 having fixed thereon cams 34 in line with trip levers 22.

The handle shaft 33 is biased in the direction to turn the cams 34 into the release or inactive positions shown in Fig. 1, by means of a spring 35 coiled about the shaft, fixed to the shaft at one end, 36, Fig. 2, and fixed to the supporting frame at the opposite end, at 37.

Turning of the cam shaft 33 in the release direction is limited by a stop pin 38 on the front frame, engageable by a stop shoulder 39 on the cam 34 at that end of the shaft.

The coaction of these two stop elements 38, 39, as shown in Fig. 1, serves to position the handle 32 in an upright relation where it may be conveniently reached for quick actuation of the feed trip.

The cams 34, as more fully shown in Fig. 3, have active cam surfaces 40 extending from the stop shoulders 39 for engagement with the upper edges of the trip levers at 41, terminating in substantially concentric holding portions 42.

With this construction the handle is free to be turned in a right-handed direction and when so turned the cam slopes 40 will force the trip levers downward from the Fig. 1 to the Fig. 3 position, and in the latter relation the concentric portions 42 will come in contact with the levers to hold them lowered and to retain the cams and cam shaft in the feed roll tripped position against the tension of the return spring 35.

At any time the trip levers may be released by simply starting the handle in the return direction, sufficiently to clear the concentric portions 42 to a point where the spring 35 will assert itself and carry the cam shaft the rest of the way back to the release position shown in Fig. 1. If not released by hand as described, the trip levers will be automatically released at the first down stroke of the press by the trip stud 30, Fig. 3, engaging the connecting bar 29 of the trip levers to take the pressure of these levers off the holding portions 42 of the cams 34. Immediately the cams are relieved of the holding pressure applied by trip levers 22, the return spring 25 will swing the cam shaft back to Fig. 1, release position.

The stop pin 38 performs an additional function in the illustration by being positioned for engagement by a limit shoulder 43 on the upper edge of the trip levers 22, forward of the edge portion 41 engaged by the cam and thus adapted to limit the upward swing of the trip levers 22.

Thus, as will be clear from Fig. 1, the stop pin 38 will hold both the trip shaft and the trip levers in their upwardly swung release positions, with the cams in engagement with the levers and ready for actuation of the same by downward turning of the handle 32.

Additionally, as indicated in Fig. 3, the stop pin 38 may limit the turning movement of the handle in the feed tripping direction by engagement of the high parts of the cams therewith, after the concentric portions of the cams have come into holding engagement with the upper edges of the trip levers.

What is claimed is:

1. Roll feed mechanism comprising separably mounted companion feed rolls, a trip lever arranged to effect separation of said feed rolls, a cam rotatable in engagement with said trip lever to effect actuation of the same, said cam having a cam slope for effecting tripping movement of said lever and a substantially concentric portion at the end of said cam slope engageable with the lever to retain it in the tripped position and a spring for rotating the cam in the trip lever releasing direction and operative to return the cam to the release position when the cam is relieved of pressure of the trip lever, a stop shoulder on the cam at the beginning of said cam slope and a stop pin engageable by said stop shoulder to position the cam in a definite release position.

2. Roll feed mechanism comprising separably mounted companion feed rolls, a trip lever arranged to effect separation of said feed rolls, a cam rotatable in engagement with said trip lever to effect actuation of the same, said cam having a cam slope for effecting tripping movement of said lever and a substantially concentric portion at the end of said cam slope engageable with the lever to retain it in the tripped position and a spring for rotating the cam in the trip lever releasing direction and operative to return the cam to the release position when the cam is relieved of pressure of the trip lever, a stop shoulder on the cam at the beginning of said cam slope and a stop pin engageable by said stop shoulder to position the cam in a definite release position and a stop shoulder on the trip lever also engageable with said stop pin in the non-tripping position of said lever.

3. Roll feed mechanism comprising separably mounted companion feed rolls, a trip lever arranged to effect separation of said feed rolls, a cam rotatable in engagement with said trip lever to effect actuation of the same, said cam having a cam slope for effecting tripping movement of said lever and a substantially concentric portion at the end of said cam slope engageable with the lever to retain it in the tripped position and a spring for rotating the cam in the trip lever releasing direction and operative to return the cam to the release position when the cam is relieved of pressure of the trip lever, a stop shoulder on the cam at the beginning of said cam slope, a stop pin engageable by said stop shoulder to position the cam in a definite release position and a stop shoulder on the trip lever also engageable with said stop pin in the non-tripping position of said lever and said stop pin also engageable by said cam slope to stop turning of the cam in the tripping direction after engagement of the holding portion of the cam with said trip lever.

FREDERICK KOCH.

REFERENCES CITED

The following references are of record in the file of this patent:

UNITED STATES PATENTS

| Number | Name | Date |
| --- | --- | --- |
| 1,421,354 | Littell | June 27, 1922 |
| 1,947,015 | Littell | Feb. 13, 1934 |
| 2,099,647 | Gautier | Nov. 16, 1937 |